(12) United States Patent
Sagorski

(10) Patent No.: US 12,239,119 B1
(45) Date of Patent: Mar. 4, 2025

(54) MULTIFUNCTION FISH HOLDER

(71) Applicant: Francis A Sagorski, Traverse City, MI (US)

(72) Inventor: Francis A Sagorski, Traverse City, MI (US)

( * ) Notice: Subject to any disclaimer, the term of this patent is extended or adjusted under 35 U.S.C. 154(b) by 0 days.

(21) Appl. No.: 18/516,433

(22) Filed: Nov. 21, 2023

(51) Int. Cl.
*A01K 97/18* (2006.01)
*A41D 19/015* (2006.01)

(52) U.S. Cl.
CPC ........ *A01K 97/18* (2013.01); *A41D 19/01594* (2013.01)

(58) Field of Classification Search
CPC .............. A01K 97/18; A41D 2600/106; A41D 19/01594
USPC ....................................................... 2/20; 43/4
See application file for complete search history.

(56) References Cited

U.S. PATENT DOCUMENTS

| | | | |
|---|---|---|---|
| 2,616,745 A * | 11/1952 | Alston | A01K 97/18 460/25 |
| 2,881,022 A | 4/1959 | Brust | |
| 2,997,805 A * | 8/1961 | Havemeyer | A01K 97/18 43/53.5 |
| 3,181,198 A | 5/1965 | Stelzen | |
| 3,236,553 A * | 2/1966 | Shrier | A01K 97/18 30/298 |
| 3,318,626 A * | 5/1967 | Hansen | A01K 97/18 294/99.1 |
| 3,905,145 A * | 9/1975 | Cunningham | A01K 97/18 43/53.5 |
| 3,975,043 A | 8/1976 | Miles | |
| 5,339,532 A | 8/1994 | O'Keefe | |
| 5,956,881 A * | 9/1999 | Dehm | A01K 97/00 43/4 |
| 7,191,536 B1 | 3/2007 | Bailey | |
| 7,661,222 B1 | 2/2010 | Bowers | |
| 8,141,262 B1 | 3/2012 | Lee | |
| 2005/0198886 A1 | 9/2005 | Rojas | |
| 2010/0314427 A1* | 12/2010 | Cartwright | A45F 5/004 43/53.5 |
| 2016/0345567 A1* | 12/2016 | Hann | A01K 97/00 |
| 2022/0022579 A1* | 1/2022 | Paaso | A41D 19/0003 |
| 2022/0030989 A1* | 2/2022 | Raymond | A41D 19/01 |
| 2022/0225708 A1* | 7/2022 | Javed | A41D 19/01594 |

FOREIGN PATENT DOCUMENTS

KR 200353761 Y1 * 6/2004 ............. A01K 97/18

* cited by examiner

Primary Examiner — Christopher D Hutchens
(74) Attorney, Agent, or Firm — Peter Loffler

(57) ABSTRACT

A multifunction fish holder helps a user grip a just caught fish and uses a base layer to which a non-slip layer is attached to an inner surface thereof. A fish hook remover, a tape measure, and a pair of pliers are all attached to the base layer, either fixedly, removably, or a combination thereof. A puncture resistance rib extends along a midline of the base layer and helps prevent a fish's fin from penetrating the device and pricking a user's hand while gripping the fish. A grip strap is located on at least one side of the base layer, on an outer surface thereof, in order to allow the user to slip a hand therethrough for better grip of the device.

14 Claims, 4 Drawing Sheets

MULTIFUNCTION FISH HOLDER

BACKGROUND OF THE INVENTION

1. Field of the Invention

The present invention relates to a holder that allows the safe and secure grabbing of a caught fish, the holder having a variety of tools that are useful during processing of the caught fish.

2. Background of the Prior Art

Recreational fishing is the great American pastime enjoyed by millions year round—of course, fishing is also enjoyed in the other corners of the world. Gather the necessary equipment for the type of fishing to be undertaken, bait up, cast and wait for the big one to bite so that dinner can be served. Whether from a boat bobbing on the water, or simply sitting on the dock of the bay, many consider fishing to be the greatest of all joys, an incredible way to do nothing all day.

Of course, the goal in fishing is to in fact, catch a fish so that pizza need not be ordered that evening that evening. Once the fish is brought aboard the boat, or landed on the dock or beach, it must be properly processed. The hook must be extracted from the mouth of the fish, hopefully with minimum injury to the happy fisherman. The fish must be identified and measured in order to ascertain that it is legal to retain both in type of fish and in size for the particular type of fish caught. Thereafter, if it is a legal catch, the fish must be stored in appropriate fashion such as in a net, a bucket, on ice, or in another storage manner. During the processing of the fish, the fish must be handled by the fisherman. Of course, the fish is wet and slippery and is thrashing about so that gripping the fish and holding it steady in order to accomplish the requisite processing tasks becomes tricky. Trying to remove a very sharp hook from a thrashing fish upon which a person has a slippery and thus ineffective grip can be quite the challenge. Of course, most fish have back fins which are often relatively hard and pointy and can hurt if they contact a person's hand or other body part.

In order to assist in processing the fish once caught, devices have been proposed that assist a user is grasping the fish in a steady fashion. Such devices help a person get a firm grip on the fish despite the fish's slippery nature, so that the various tasks to be performed can be accomplished with relative ease and with diminished risk of injury. Such devices, which come in a wide variety of architectures and which work with varying degrees of effectiveness, are designed to help a person get a more effective grip on the slippery fish relative to bare hands so that the needed tasks can be performed, quicker, easier, and with less injury potential. However, such prior art devices are not without their drawbacks.

Some prior art devices are relatively complex in design and construction so that such devices are relatively difficult to use and are relatively expensive to produce and obtain. Other devices are designed to grip fish that are in a relatively narrow size range so that such devices are of limited utility. Still other devices provide limited functionality in the overall fish processing task.

What is needed is a device that helps a person safety grasp a just caught fish in order to handle and process the fish as needed. Such a device must be of relatively simple design so that the device is relatively easy to deploy. As a person does not know what particular fish will be caught in a given fish snag, such a device must be usable with fish in a relatively large size range. Such a device must assist in performing a number of processing steps of the caught fish.

SUMMARY OF THE INVENTION

The multifunction fish holder of the present invention addresses the aforementioned needs in the art by providing a device that allows a person to quickly and easily grasp a just caught fish and to maintain a relatively firm grip on the fish while performing needed task upon the fish. The multifunction fish holder is of relatively design and construction, making the device relatively easy to use and maintain. The multifunction fish holder is produced using standard manufacturing techniques so that the device is economically attractive to potential consumers for this type of device. The multifunction fish holder works across a broad range of fish sizes and assists a user in performing several processing steps on the just landed fish. The multifunction fish holder helps minimize injury to the user.

The multifunction fish holder of the present invention is comprised of a relatively flat, flexible base layer that has an inner surface and an opposing outer surface. A longitudinal midline exists along the middle of the base layer. A non-slip grip layer, also a relatively flat member, is attached to the inner surface of the base layer in appropriate fashion. A fish hook remover is removably attached to the outer surface of the base layer and may be strapped to the base layer for relatively solid securement thereto. A tape measure is attached, removably or fixedly, to the outer surface of the base layer. A pair of pliers is removably attached to the base layer and may be held within a pouch located on the outer surface of the base layer. A grip strap is attached to outer surface of the base layer and offset from the midline, allowing for a user's hand to slip therethrough for better grip on the device. Two grip straps may be provided, one grip strap on each side of the midline. Each grip strap may run parallel with the midline. A rib, made from a hard, flexible material, is attached to the base layer and extends a portion of the midline of the base layer. The rib, is a puncture resistance member that helps protect the user's hand from injury that can otherwise occur due to contact with the back fin of a fish. The rib may be attached to the either inner surface of the base layer or to the outer surface of the base layer. A lanyard has a first end attached to the pliers and a second end attached to the base layer in prevent inadvertent loss of the pliers.

BRIEF DESCRIPTION OF THE DRAWINGS

Similar reference numerals refer to similar parts throughout the several views of the drawings.

DESCRIPTION OF THE PREFERRED EMBODIMENT

Figure 1:
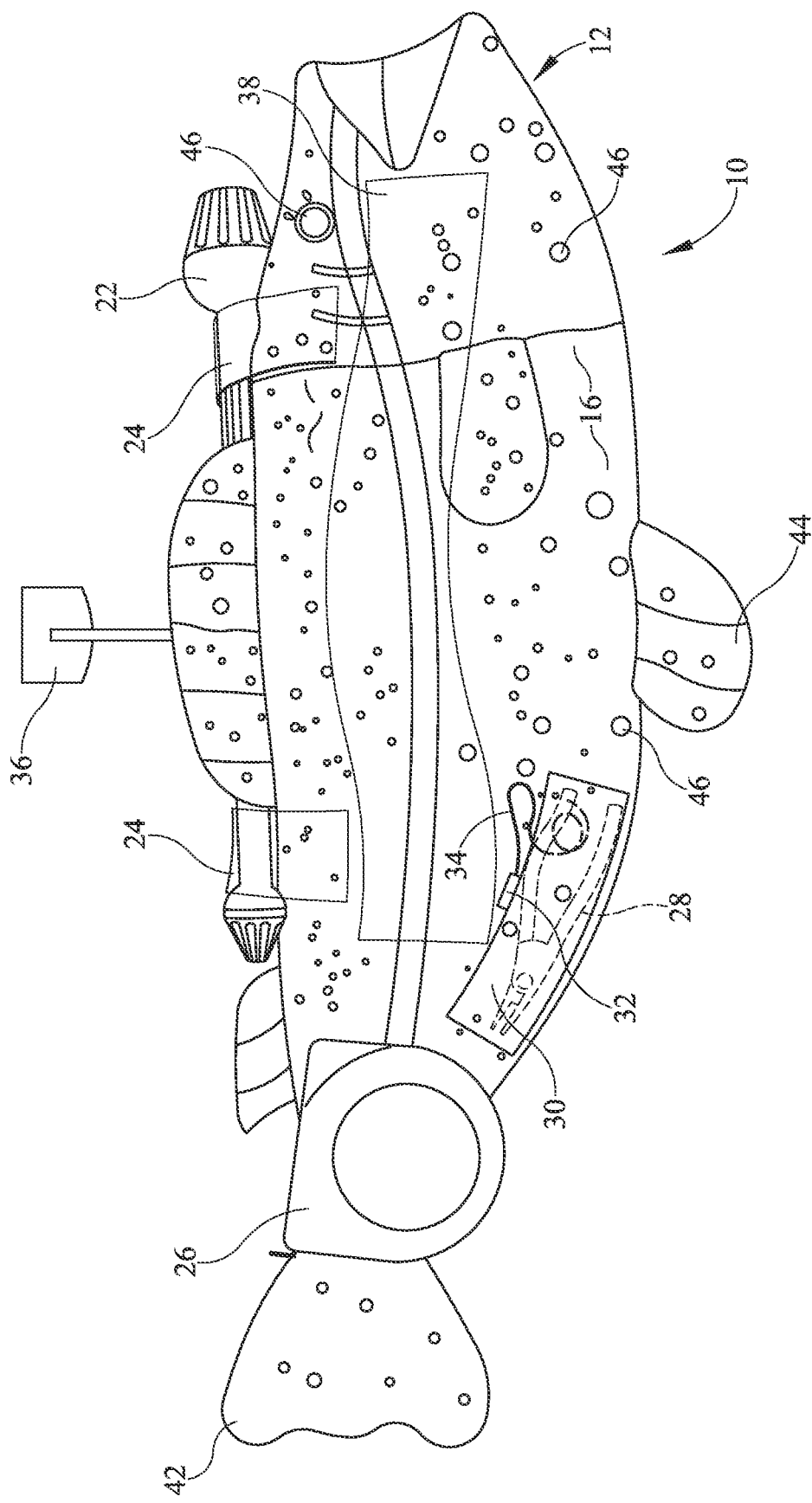
FIG. 1 is a side view of the multifunction fish holder of the present invention.
Figure 2:
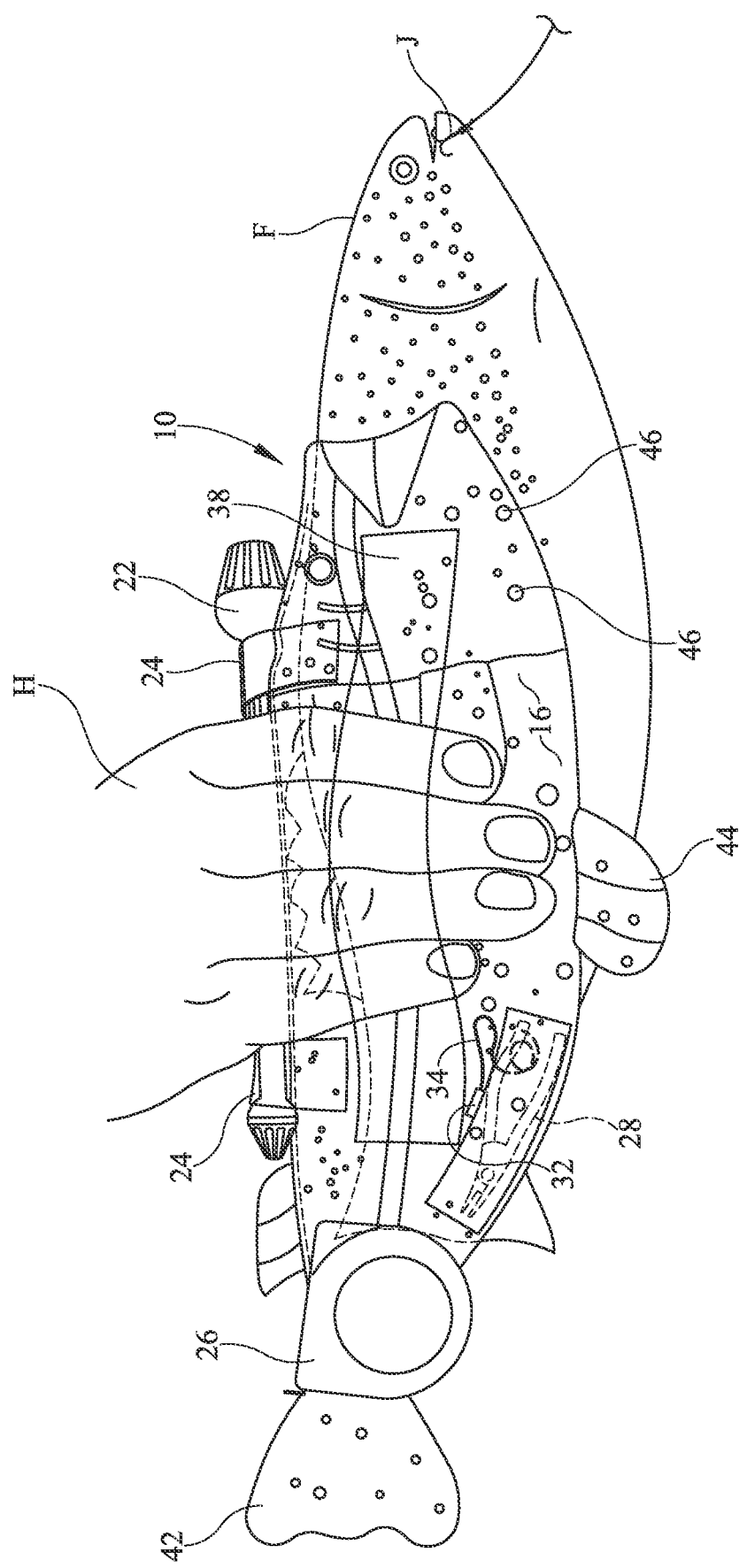
FIG. 2 is a side view of the multifunction fish holder holding a fish and being grasped by a user.
Figure 3:
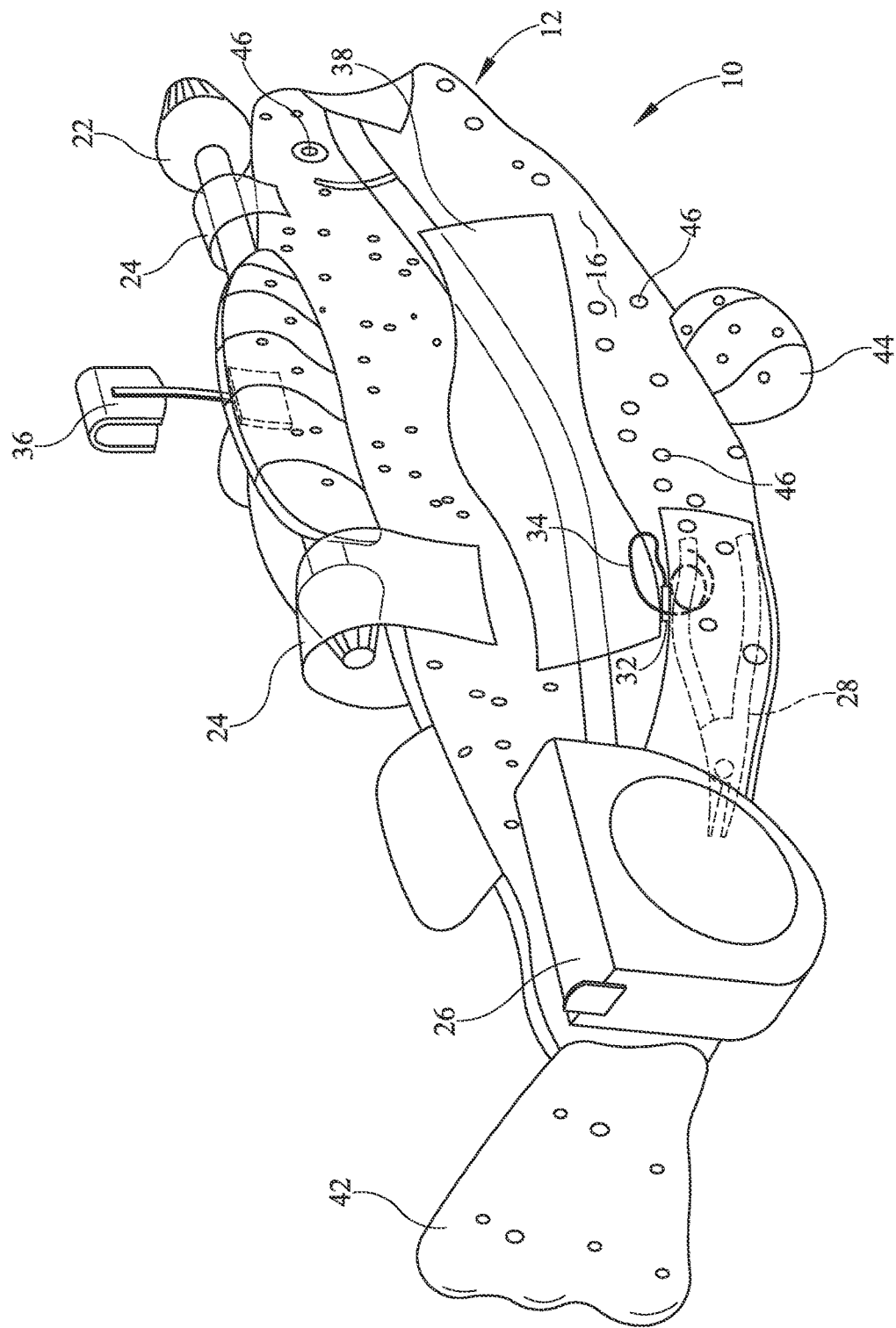
FIG. 3 is a perspective view of the multifunction fish holder.
Figure 4:
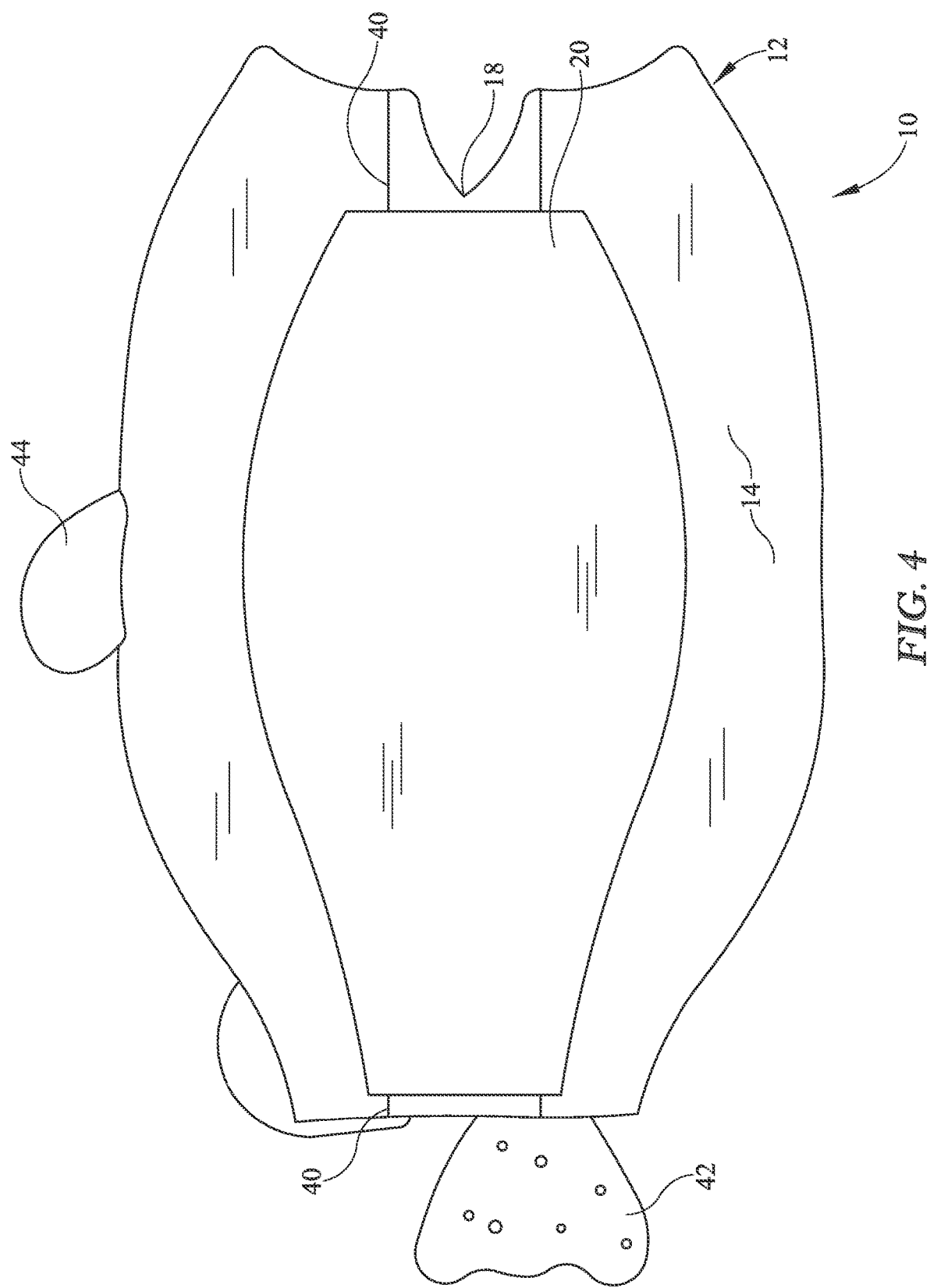
FIG. 4 is a bottom view of the multifunction fish holder laid open.

Referring now to the drawings, it is seen that the multifunction fish holder of the present invention, generally denoted by reference numeral 10, is comprised of a base layer 12 that is made from a flexible material such as cloth, which can be cotton or cotton blend, woven terrycloth, etc. As seen, the base layer 12 can generally be in the shape of a fish torso, although the specific shape is not of concern as long as the base layer 12 has sufficient elongate properties. The base layer has an inner surface 14 and an opposing outer surface 16, and a midline 18, which, as seen in FIG. 4, runs horizontally and separates the base layer 12 into two, substantially similar sections. A grip layer 20 is attached to the inner surface 14 of the base layer 12 in appropriate fashion, such as via adhesion. The grip layer 20 is made from a non-slip, flexible material such as rubber, neoprene, silicone, etc., and may have a non-smooth texture on its outer facing surface for additional grip capabilities.

A fish hook remover 22, of appropriate design, is removably attached to the base layer 12, at the outer surface 16 thereof, the fish hook remover 22 extending generally along the midline 18 when so attached. The fish hook remover 22 is secured to the base layer 12 via one or more hook remover straps 24 attached to the base layer 12. The hook remover straps 24 may be closed so that fish hook remover 22 slides into and out of the loop formed by the hook remover straps 24 and base layer 12 or the hook remover straps may be openable so that the fish hook remover 22 is placed into position along the base layer 12 and the hook remover straps are then closed and cinched about the fish hook remover 22 and secured in the closed position in appropriate fashion such as via the use of cooperating hook and loop material (not illustrated) on each of the two strap sections (or strap section and the base layer).

Attached to the base layer 12, to the outer surface 16 thereof, is a tape measure 26 of appropriate design. The tape measure 26 can be fixedly attached to the base layer 12 in appropriate fashion such as via adhesion, fasteners, etc., or the tape measure 26 can be removably attached to the base layer 12 in appropriate fashion such as via cooperating hook and loop material, snaps (neither illustrated), etc.

A pair of pliers 28 is removably held within a pouch 30 located on the outer surface 16 of the base layer 12. An optional openable pouch strap 32 can be used to help secure the pliers 28 within the pouch 30. If desired a lanyard 34 can have one end attached to the pliers 28 and its opposing end attached to the multifunction fish holder 10 (to the base layer 12, to the pouch 30 or strap 32, etc.,).

A clip 36 is attached to the base layer 12 on a side opposite the side to which the tape measure 26 and pouch 30 are attached in order to allow a user to attach the multifunction fish holder 10 to their pants pocket or similar location and help prevent the multifunction fish holder 10 from becoming lost. The clip can be of any typical design such as a basic pocket clip, the illustrated tethered clip, etc.

At least one grip strap 38 is attached to outer surface 16 of the base layer 12 in appropriate fashion, either on one side of the midline 18 or on both sides of the midline 18, one grip strap 38 on each side of the midline 18 so that the multifunction fish holder 10 is ambidextrous in use. The grip strap 38 allows a user to slip their hand H through the opening created by the base layer 12 and the grip strap 38 so that the hand H is snugly held therein, allowing for a better and more secure grip of the multifunction fish holder 10 by the user.

A rib 40 is attached to the base layer 12 along at least a portion of the midline 18 on either the inner surface 14 (either under or over the grip layer 20) or on the outer surface 16 thereof. The rib 40 is made from a hard yet somewhat flexible material, such as flexible plastic and is puncture resistant to help to prevent a user from being stabbed by the fins of a fish F when gripping a fish F using the multifunction fish holder 10. The rib 40 is attached to the base layer 12 (and possibly the grip layer 20) in appropriate fashion such as via adhesion.

As seen, decorative elements, such as a fish tail 42, fish fins 44, and fish body printing 46 can be located on the multifunction fish holder 10 for aesthetic purposes.

In order to use the multifunction fish holder 10 of the present invention, a user places their hand H through one of the grip straps 38 and wraps the multifunction fish holder 10 about a fish F such that the grip layer 20 is in contact with the fish F. The grip layer 20, by being made from a non-slip material, allows for a firm steady grip on the fish F without undue slippage even if the fish is still struggling. The rib 40 prevents any sharp back fins of the fish F from piercing through the multifunction fish holder 10 in order to protect the user's hand H from the sharpness of the fins. The rib 40 is sufficiently flexible to allow the bending of the rib 40 whenever the base layer 12 and grip layer 20 are bent about the midline 18 when wrapping the multifunction fish holder 10 about the fish F. The user removes the fish hook remover 22 and uses the fish hook remover 22 to remove the hook J from the fish F. The user measures the fish F using the tape measure 26. As the pliers 28 are needed, they are removed from the pouch 30 and used in appropriate fashion and thereafter returned to the pouch and strapped in.

The multifunction fish holder 10 can be clipped to the user's pants pocket, to a handbag, to a side of a tackle box etc., via the clip 36. The multifunction fish holder 10 can be simply hosed off with water as needed when it becomes a bit funky.

While the invention has been particularly shown and described with reference to an embodiment thereof, it will be appreciated by those skilled in the art that various changes in form and detail may be made without departing from the spirit and scope of the invention.

I claim:

1. A gripper comprising:
    a flexible base layer having an inner surface and an opposing outer surface, and a longitudinal midline;
    a non-slip grip layer attached to the inner surface of the base layer;
    a fish hook remover removably attached to the outer surface of the base layer;
    a tape measure attached to the outer surface of the base layer; and
    a rib, made from a puncture resistance, flexible material, attached to the base layer and extending along a portion of the midline of the base layer.

2. The gripper as in claim 1 further comprising a pair of pliers removably attached to the base layer.

3. The gripper as in claim 2 wherein the pliers are removably held within a pouch located on the outer surface of the base layer.

4. The gripper as in claim 2 further comprising a lanyard having a first end attached to the pliers and a second end attached to the base layer.

5. The gripper as in claim 1 wherein the rib is attached to the inner surface of the base layer.

6. The gripper as in claim 1 wherein the rib is attached to the outer surface of the base layer.

7. The gripper as in claim 1 further comprising a grip strap attached to the outer surface of the base layer and offset from the midline, the grip strap dimensioned to allow a human hand to slip between the grip strap and the base layer.

8. The gripper as in claim 7 wherein the grip strap is parallel with the midline.

9. A gripper comprising:
- a flexible base layer having an inner surface and an opposing outer surface, and a longitudinal midline;
- a non-slip grip layer attached to the inner surface of the base layer;
- a fish hook remover removably attached to the outer surface of the base layer;
- a tape measure attached to the outer surface of the base layer;
- a pair of pliers removably attached to the base layer;
- a grip strap attached to outer surface of the base layer and offset from the midline, the grip strap dimensioned to allow a human hand to slip between the grip strap and the base layer; and
- a rib, made from a puncture resistance, flexible material, attached to the base layer and extending a portion of the midline of the base layer.

10. The gripper as in claim 9 wherein the pliers are removably held within a pouch located on the outer surface of the base layer.

11. The gripper as in claim 9 further comprising a lanyard having a first end attached to the pliers and a second end attached to the base layer.

12. The gripper as in claim 9 wherein the rib is attached to the inner surface of the base layer.

13. The gripper as in claim 9 wherein the rib is attached to the outer surface of the base layer.

14. The gripper as in claim 9 wherein the grip strap is parallel with the midline.

\* \* \* \* \*